(12) United States Patent
Oules

(10) Patent No.: US 11,678,045 B2
(45) Date of Patent: *Jun. 13, 2023

(54) STABILIZATION OF FACE IN VIDEO

(71) Applicant: GoPro, Inc., San Mateo, CA (US)

(72) Inventor: Guillaume Oules, Bordeaux (FR)

(73) Assignee: GoPro, Inc., San Mateo, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/976,249

(22) Filed: Oct. 28, 2022

(65) Prior Publication Data

US 2023/0049509 A1 Feb. 16, 2023

Related U.S. Application Data

(63) Continuation of application No. 17/575,346, filed on Jan. 13, 2022, now Pat. No. 11,496,672, which is a continuation of application No. 17/239,479, filed on Apr. 23, 2021, now Pat. No. 11,228,702.

(51) Int. Cl.
*H04N 23/611* (2023.01)
*H04N 23/60* (2023.01)

(52) U.S. Cl.
CPC ........... *H04N 23/611* (2023.01); *H04N 23/64* (2023.01)

(58) Field of Classification Search
CPC ........... H04N 5/23219; H04N 5/23222; H04N 5/144; H04N 5/145; H04N 5/147; H04N 5/23251; H04N 5/23254; H04N 5/23261; H04N 5/23264; H04N 5/23274; H04N 5/23277; H04N 5/23293; H04N 5/232933; H04N 23/64; H04N 23/611; H04N 23/683; G06T 7/20; G06T 7/246; G06T 2207/30201
USPC ........................................................ 348/222.1
See application file for complete search history.

(56) References Cited

U.S. PATENT DOCUMENTS

| | | | | |
|---|---|---|---|---|
| 5,227,889 | A * | 7/1993 | Yoneyama | H04N 23/683 348/E5.078 |
| 8,134,604 | B2 * | 3/2012 | Fujita | H04N 23/682 348/208.6 |
| 8,477,200 | B2 * | 7/2013 | Fujita | G03B 15/00 348/208.13 |
| 8,704,856 | B2 * | 4/2014 | Misawa | H04N 23/635 345/634 |
| 8,749,647 | B2 * | 6/2014 | Harikae | H04N 1/00307 348/333.12 |
| 8,786,754 | B2 * | 7/2014 | Narita | H04N 23/64 348/333.12 |
| 9,256,986 | B2 * | 2/2016 | Kasahara | G06T 19/006 |
| 9,456,139 | B2 | 9/2016 | Gotoh | |
| 9,967,461 | B2 | 5/2018 | Hong | |
| 10,038,836 | B2 * | 7/2018 | Chen | H04N 5/772 |
| 10,091,414 | B2 * | 10/2018 | Chan | H04N 23/63 |
| 10,171,738 | B1 | 1/2019 | Liang | |
| 10,326,936 | B2 * | 6/2019 | Jeon | H04N 23/635 |
| 10,540,806 | B2 | 1/2020 | Samuel | |
| 10,547,790 | B2 * | 1/2020 | Juang | H04N 23/60 |

(Continued)

*Primary Examiner* — Pritham D Prabhakher

(74) *Attorney, Agent, or Firm* — Esplin & Associates, PC

(57) ABSTRACT

Placement of a face depicted within a video may be determined. One or more stabilization options for the video may be obtained. Stabilization option(s) may include angle stabilization option, a position stabilization option, and/or a size stabilization option. The video may be stabilized based on the placement of the face and the stabilization option(s).

20 Claims, 11 Drawing Sheets

(56) References Cited

U.S. PATENT DOCUMENTS

| | | |
|---|---|---|
| 10,742,885 B1 | 8/2020 | Kok |
| 10,757,319 B1 | 8/2020 | Luo |
| 10,812,717 B2 | 10/2020 | Liang |
| 10,915,223 B2 | 2/2021 | Ku |
| 10,924,636 B1 | 2/2021 | Mcintosh |
| 10,929,982 B2 | 2/2021 | Hefny |
| 11,102,413 B2 * | 8/2021 | Juang ................... H04N 23/60 |
| 11,153,476 B2 * | 10/2021 | Ito ........................ H04N 23/64 |
| 11,196,933 B2 * | 12/2021 | Misawa ............... H04N 23/611 |
| 11,228,702 B1 | 1/2022 | Oulès |
| 11,496,672 B1 | 11/2022 | Oules |
| 2006/0017813 A1 | 1/2006 | Okubo |
| 2007/0242861 A1 * | 10/2007 | Misawa ............... H04N 23/611 |
| | | 348/222.1 |
| 2008/0111889 A1 * | 5/2008 | Fujita ................... H04N 23/68 |
| | | 348/E5.025 |
| 2011/0090390 A1 | 4/2011 | Narita |
| 2011/0115933 A1 | 5/2011 | Yamazaki |
| 2011/0149094 A1 | 6/2011 | Chen |
| 2011/0310283 A1 | 12/2011 | Shiozaki |
| 2012/0242849 A1 | 9/2012 | Herz |
| 2013/0002923 A1 | 1/2013 | Kanma |
| 2013/0321650 A1 | 12/2013 | Gotoh |
| 2015/0206354 A1 | 7/2015 | Shibuhisa |
| 2016/0378181 A1 | 12/2016 | Nasca |
| 2017/0111584 A1 | 4/2017 | Hong |
| 2018/0348992 A1 | 12/2018 | Ku |
| 2019/0342497 A1 | 11/2019 | Liang |
| 2020/0014847 A1 | 1/2020 | Ito |
| 2020/0154053 A1 * | 5/2020 | Juang ................ H04N 23/6812 |
| 2020/0242778 A1 | 7/2020 | Hefny |
| 2021/0037179 A1 | 2/2021 | Luo |
| 2022/0345620 A1 | 10/2022 | Oules |

\* cited by examiner

902

904

906

908

1002

1004

1006

STABILIZATION OF FACE IN VIDEO

FIELD

This disclosure relates to stabilization of faces depicted within videos.

BACKGROUND

A video may include depiction of a moving thing. A user may wish to maintain position, angle, and/or scale of the depiction of the moving thing within the video.

SUMMARY

This disclosure relates to stabilizing videos. Video information and/or other information may be obtained. The video information may define a video having a progress length. The video may include visual content. The visual content may include depiction of a face. Placement of the face within the visual content may be determined as the function of progress through the progress length. Selection of one or more facial stabilization options may be obtained. Stabilized visual content may be generated based on the placement of the face within the visual content as the function of progress through the progress length, the facial stabilization option(s), and/or other information. The stabilized visual content may include stabilized depiction of the face.

A system that stabilizes videos may include one or more electronic storage, processor, and/or other components. The electronic storage may store video information, information relating to video, information relating to visual content, information relating to depiction of a face, information relating to facial stabilization options, information relating to stabilized visual content, and/or other information.

The processor(s) may be configured by machine-readable instructions. Executing the machine-readable instructions may cause the processor(s) to facilitate stabilizing videos. The machine-readable instructions may include one or more computer program components. The computer program components may include one or more of a video information component, a placement component, a stabilization option component, a generation component, and/or other computer program components.

The video information component may be configured to obtain video information and/or other information. The video information may define a video. The video may have a progress length. The video may include visual content and/or other content. The visual content may have a field of view. The visual content may include depiction of a face.

The placement component may be configured to determine placement of the face within the visual content. The placement of the face within the visual content may be determined as the function of progress through the progress length of the video. In some implementations, the placement of the face within the visual content may include one or more of rotation, position, and/or size of the face within the visual content. In some implementations, the placement of the face within the visual content may be determined based on a width line that runs across eyes of the face.

The stabilization option component may be configured to obtain selection of one or more stabilization options. The stabilization option(s) may include one or more facial stabilization options. In some implementations, the selection of the facial stabilization option(s) may be obtained based on user input identifying the facial stabilization option(s).

In some implementations, the facial stabilization option(s) may include an angle stabilization option, a position stabilization option, a size stabilization option, and/or other facial stabilization option(s). The angle stabilization option may reduce angular movement of the stabilized depiction of the face within the stabilized visual content. The position stabilization option may reduce translational movement of the stabilized depiction of the face within the stabilized visual content. The size stabilization option may reduce change in size of the stabilized depiction of the face within the stabilized visual content.

The generation component may be configured to generate stabilized visual content. The stabilized visual content may be generated based on the placement of the face within the visual content as the function of progress through the progress length, the facial stabilization option(s), and/or other information. The stabilized visual content may include the stabilized depiction of the face.

In some implementations, generation of the stabilization visual content may include determination of a viewing window for the visual content. The viewing window may be determined as the function of progress through the progress length of the video based on the placement of the face within the visual content as the function of progress through the progress length, the facial stabilization option(s), and/or other information. The viewing window may define extents of the visual content to be included within the stabilized visual content as the function of progress through the progress length of the video.

In some implementations, the determination of the viewing window may include determination of rotation of the viewing window with respect to the field of view of the visual content based on the placement of the face within the visual content and the angle stabilization option. In some implementations, the determination of the viewing window may include determination of position of the viewing window within the field of view of the visual content based on the placement of the face within the visual content and the position stabilization option. In some implementations, the determination of the viewing window may include determination of size of the viewing window based on the placement of the face within the visual content and the size stabilization option.

These and other objects, features, and characteristics of the system and/or method disclosed herein, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a," "an," and "the" include plural referents unless the context clearly dictates otherwise.

DETAILED DESCRIPTION

Figure 1:
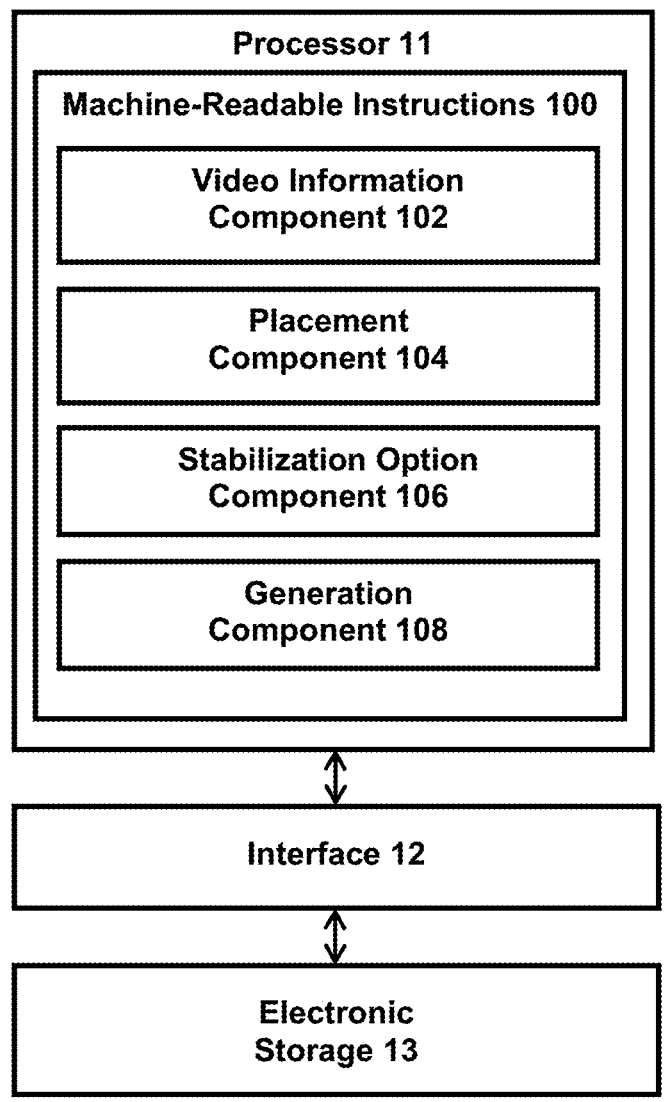
FIG. 1 illustrates a system that stabilizes videos.

FIG. 1 illustrates a system 10 that stabilizes videos. The system 10 may include one or more of a processor 11, an interface 12 (e.g., bus, wireless interface), an electronic storage 13, and/or other components. Video information and/or other information may be obtained by the processor 11. The video information may define a video having a progress length. The video may include visual content. The visual content may include depiction of a face. Placement of the face within the visual content may be determined by the processor 11 as the function of progress through the progress length. Selection of one or more facial stabilization options may be obtained by the processor 11. Stabilized visual content may be generated by the processor 11 based on the placement of the face within the visual content as the function of progress through the progress length, the facial stabilization option(s), and/or other information. The stabilized visual content may include stabilized depiction of the face.

The electronic storage 13 may be configured to include electronic storage medium that electronically stores information. The electronic storage 13 may store software algorithms, information determined by the processor 11, information received remotely, and/or other information that enables the system 10 to function properly. For example, the electronic storage 13 may store video information, information relating to video, information relating to visual content, information relating to depiction of a face, information relating to facial stabilization options, information relating to stabilized visual content, and/or other information.

Content of one or more videos may be referred to as video content. Video content may have a progress length. That is, a video may include video content having a progress length. A progress length may be defined in terms of time durations and/or frame numbers. For example, video content of a video may have a time duration of 60 seconds. Video content of a video may have 1800 video frames. Video content having 1800 video frames may have a play time duration of 60 seconds when viewed at 30 frames per second. Other progress lengths, time durations, and frame numbers are contemplated.

Video content may include visual content, audio content, and/or other content. For example, video content may include visual content viewable as a function of progress through the progress length of the video content, audio content playable as a function of progress through the progress length of the video content, and/or other content that may be played back as a function of progress through the progress length of the video content.

Visual content may refer to content of image(s), video frame(s), and/or video(s) that may be consumed visually. For example, visual content may be included within one or more images and/or one or more video frames of a video. The video frame(s) may define/contain the visual content of the video. That is, video may include video frame(s) that define/contain the visual content of the video. Video frame(s) may define/contain visual content viewable as a function of progress through the progress length of the video content. A video frame may include an image of the video content at a moment within the progress length of the video. As used herein, term video frame may be used to refer to one or more of an image frame, frame of pixels, encoded frame (e.g., I-frame, P-frame, B-frame), and/or other types of video frame. Visual content may be generated based on light received within a field of view of a single image sensor or within fields of view of multiple image sensors.

Visual content (of image(s), of video frame(s), of video(s)) with a field of view may be captured by an image capture device during a capture duration. A field of view of visual content may define a field of view of a scene captured within the visual content. A capture duration may be measured/defined in terms of time durations and/or frame numbers. For example, visual content may be captured during a capture duration of 60 seconds, and/or from one point in time to another point in time. As another example, 1800 images may be captured during a capture duration. If the images are captured at 30 images/second, then the capture duration may correspond to 60 seconds. Other capture durations are contemplated.

Visual content may be stored in one or more formats and/or one or more containers. A format may refer to one or more ways in which the information defining visual content is arranged/laid out (e.g., file format). A container may refer to one or more ways in which information defining visual content is arranged/laid out in association with other information (e.g., wrapper format). Information defining visual content (visual information) may be stored within a single file or multiple files. For example, visual information defining an image or video frames of a video may be stored within a single file (e.g., image file, video file), multiple files (e.g., multiple image files, multiple video files), a combination of different files, and/or other files. In some implementations, visual information may be stored within one or more visual tracks of a video.

Audio content may refer to media content that may be consumed as one or more sounds. Audio content may include one or more sounds stored in one or more formats/containers, and/or other audio content. Audio content may include one or more sounds captured by one or more sound sensors (e.g., microphone). Audio content may include audio/sound captured during the capture of the visual content and/or audio/sound provided as an accompaniment for the visual content. Audio content may include one or more of voices, activities, songs, music, and/or other audio/sounds. Audio content may include sounds captured by a single sound sensor or an array of sound sensors. The audio content may be captured by one or more sound sensors of the image capture device (e.g., microphone(s) of and/or coupled to the image capture device) and/or may be captured by one or more sound sensors separate from the image capture device (e.g., microphone(s) separate from the image capture device).

Audio content may be stored in one or more formats and/or one or more containers. Information defining audio content (audio information) may be stored within a single file or multiple files. For example, audio information defining sound recorded with frames of a video may be stored within a single file (e.g., audio file, video file), multiple files (e.g., multiple audio files, multiple video files), a combination of different files, and/or other files. Audio information may be stored with and/or separate from the video information. In some implementations, audio information may be stored within one or more audio tracks of a video.

The processor 11 may be configured to provide information processing capabilities in the system 10. As such, the processor 11 may comprise one or more of a digital processor, an analog processor, a digital circuit designed to process information, a central processing unit, a graphics processing unit, a microcontroller, an analog circuit designed to process information, a state machine, and/or other mechanisms for electronically processing information. The processor 11 may be configured to execute one or more machine-readable instructions 100 to facilitate stabilizing videos. The machine-readable instructions 100 may include one or more computer program components. The machine-readable instructions 100 may include one or more of a video information component 102, a placement component 104, a stabilization option component 106, a generation component 108, and/or other computer program components.

The video information component 102 may be configured to obtain video information and/or other information. Obtaining video information may include one or more of accessing, acquiring, analyzing, determining, examining, identifying, loading, locating, opening, receiving, retrieving, reviewing, selecting, storing, and/or otherwise obtaining the video information. The video information component 102 may obtain video information from one or more locations. For example, the video information component 102 may obtain video information from a storage location, such as the electronic storage 13, electronic storage of information and/or signals generated by one or more sensors, electronic storage of a device accessible via a network, and/or other locations. The video information component 102 may obtain video information from one or more hardware components (e.g., an image sensor) and/or one or more software components (e.g., software running on a computing device).

In some implementations, the video information component 102 may obtain video information based on user interaction with a user interface/application (e.g., video editing application, video player application), and/or other information. For example, a user interface/application may provide option(s) for a user to stabilize a video/depiction of a thing within a video. The video information defining a video may be obtained based on the user's selection of the video through the user interface/video application. Other selections of video for retrieval of video information are contemplated.

The video information may define a video. The video may have a progress length. The video may include visual content, audio content, and/or other content. The video may include visual content, audio content, and/or other content having a progress length. The video information may define a video by including information that defines one or more content, qualities, attributes, features, and/or other aspects of the video/video content. For example, the video information may define video content by including information that makes up the content of the video and/or information that is used to determine the content of the video. For instance, the video information may include information that makes up and/or is used to determine the arrangement of pixels, characteristics of pixels, values of pixels, and/or other aspects of pixels that define visual content of the video. The video information may include information that makes up and/or is used to determine audio content of the video. Other types of video information are contemplated.

In some implementations, the video content may include spherical video content. The field of view of the visual content of spherical video content may include a spherical field of view. Spherical field of view may include full spherical field of view (360 degrees of capture) or partial spherical field of view (less than 360 degrees of capture). The visual content may be viewable from a point of view as the function of progress through the progress length. Spherical video content may include and/or may be associated with spatial sounds.

Video information may be stored within a single file or multiple files. For example, video information defining video content may be stored within a video file, multiple video files, a combination of different files (e.g., a visual file and an audio file), and/or other files. Video information may be stored in one or more formats or containers. A format may refer to one or more ways in which the information defining a video is arranged/laid out (e.g., file format). A container may refer to one or more ways in which information defining a video is arranged/laid out in association with other information (e.g., wrapper format).

The visual content may have a field of view. The field of view of the visual content may refer to a portion of a scene that was observed by one or more image capture devices in capturing the visual content. The field of view may refer to the extent (e.g., angle, size) of the scene that is captured within the visual content.

Figure 3:
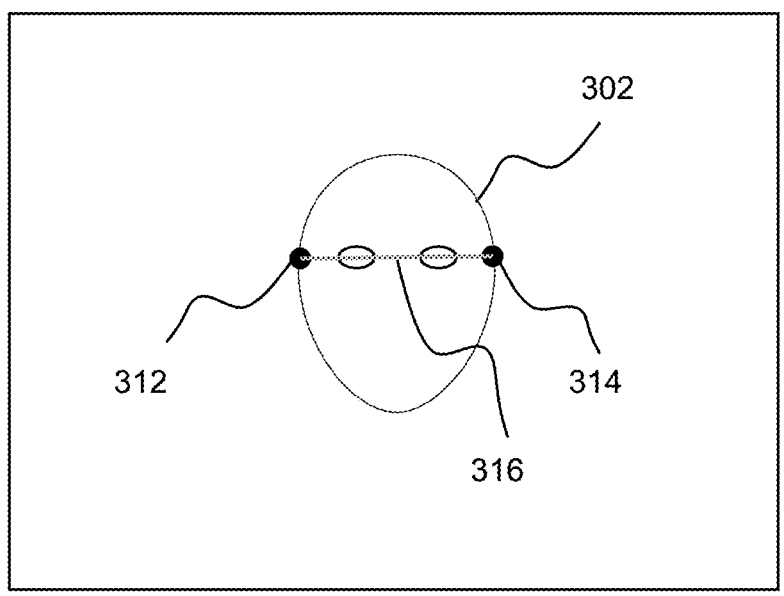
FIG. 3 illustrates an example face depicted within a video.

The visual content may include depiction of one or more things. One or more video frames of a video may include depiction of one or more things. The visual content may include depiction of a living thing and/or a non-living thing. The visual content may include depiction of the entirety of a thing or one or more parts of the thing. For example, the visual content may include depiction of a face (e.g., a person's face). For instance, the visual content of the video may be captured by an image capture device that includes the face within the field of view of the image capture device. FIG. 3 illustrates an example face 302 depicted within visual content 300 of a video.

The depiction of a thing within the visual content may move during the progress length of the video. For example, the thing and/or the image capture device capturing the video may move during capture of the video. Such movement may cause the depiction of the thing to change placement within the field of view of the visual content. Placement of the thing depicted within the visual content may refer to statement of how the thing is depicted within the visual content. Placement of the thing depicted within the visual content may refer to location and/or arrangement of the depiction of the thing within the visual content. Placement of the thing depicted within the visual content may include one or more of rotation, position, and/or size of the thing depicted within the visual content. For example, a person's head may move during capture of the video, which may cause the placement (e.g., rotation, position, size) of the face depicted within the visual content of the video to change.

Figure 4:
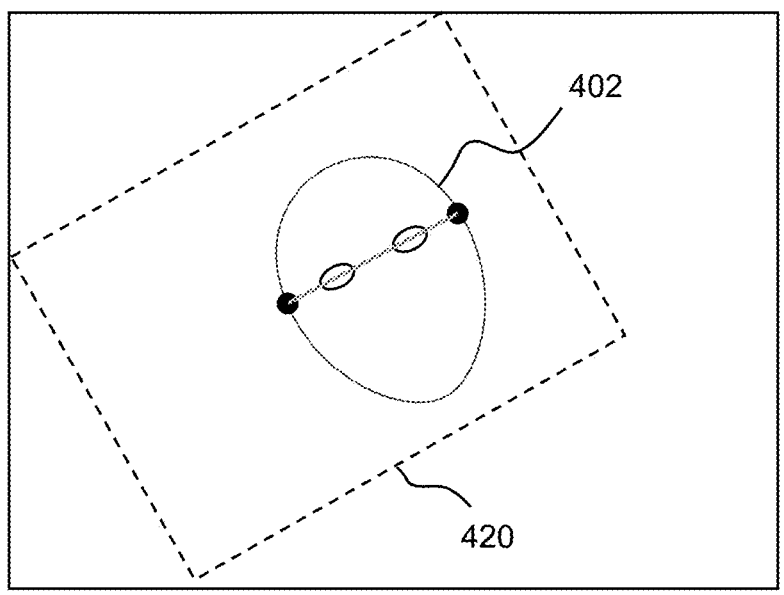
FIG. 4 illustrates an example viewing window to stabilize depiction of a face within a video.
Figure 5:
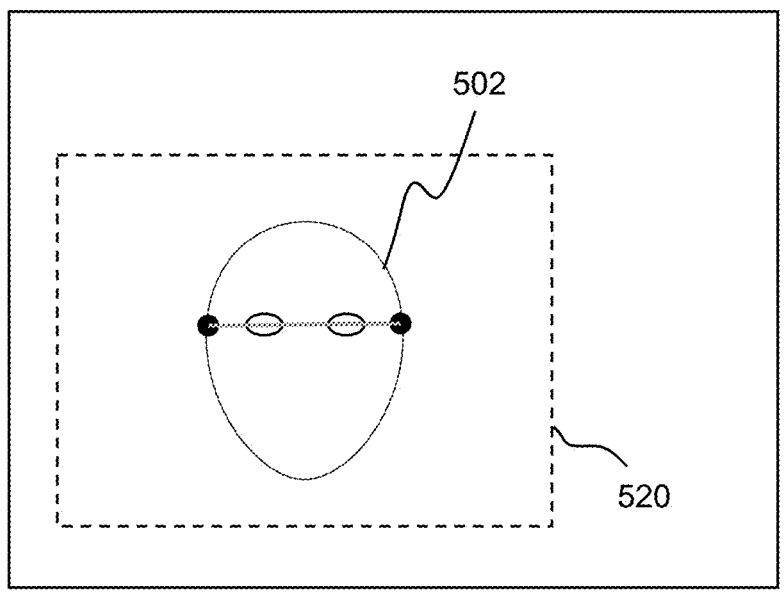
FIG. 5 illustrates an example viewing window to stabilize depiction of a face within a video.
Figure 6:
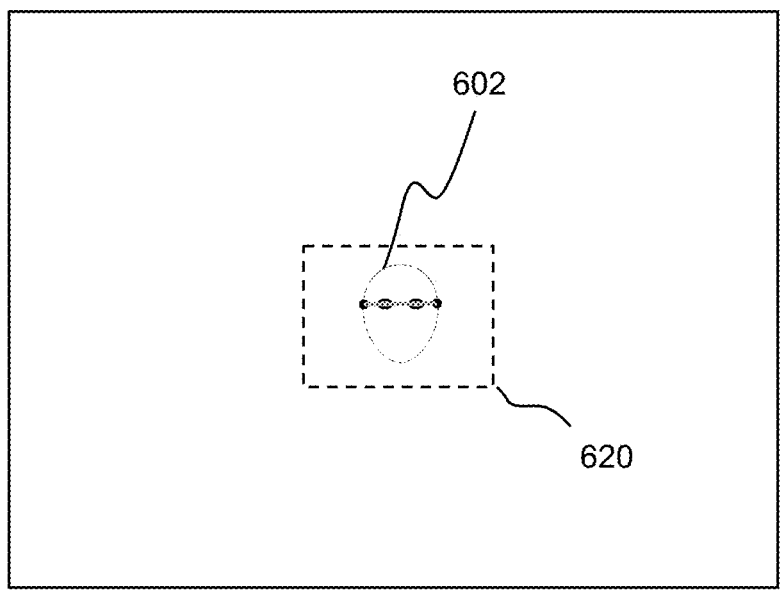
FIG. 6 illustrates an example viewing window to stabilize depiction of a face within a video.
Figure 7:
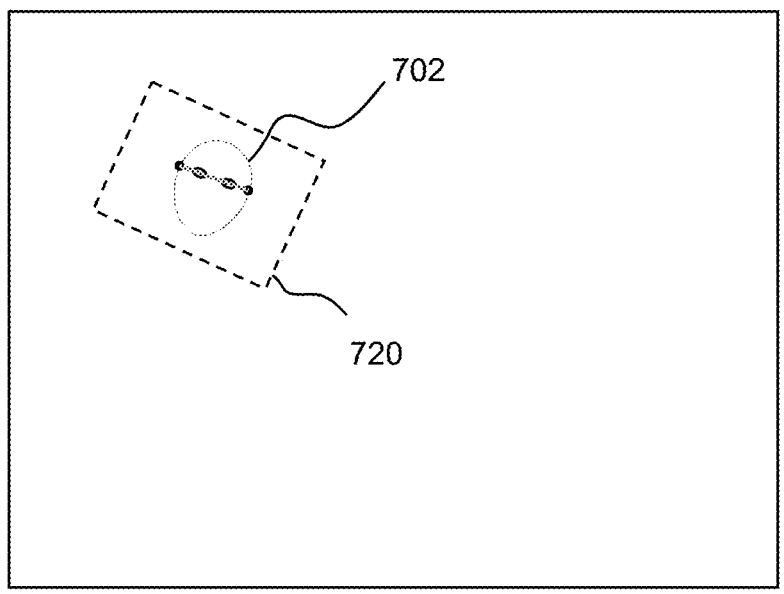
FIG. 7 illustrates an example viewing window to stabilize depiction of a face within a video.

For example, FIGS. 4, 5, 6, and 7 illustrate different placements of a face depicted within different video frames of a video. In FIG. 4, a face 402 may be depicted at the center of a video frame 400 (at the center of the field of view of the video frame 400). The face 402 may be rotated to the left. In FIG. 5, a face 502 may be depicted at a position that is below and to the left of the center of a video frame 500. The face 502 may be upright. The size of the face 502 depicted within the video frame 500 may be the same as the size of the face 402 depicted within the video frame 400. In FIG. 6, a face 602 may be depicted at the center of a video frame 500. The face 602 may be upright. The face 602 depicted in the video frame 600 may be smaller than in the faces 402, 502 depicted in the video frames 400, 500 (e.g., due to the face in the scene being farther away from the image capture device when the image capture device captured the video frame 600 than when the image capture device captured the video frames 400, 500). In FIG. 7, a face 702 may be depicted at a position that is above and to the left of the center of a video frame 700. The face 702 may be rotated to the right. The size of the face 702 depicted within the video frame 700 may be the same size as the face 602 depicted within the video frame 600.

The placement component 104 may be configured to determine placement of the thing(s) within the visual content. For example, the placement component 104 may be configured to determine placement of a face within the visual content. Placement determination of other things within the visual content is contemplated. Determining placement of a thing within the visual content may include ascertaining, detecting, establishing, finding, identifying, obtaining, and/or otherwise determining the placement of the thing within the visual content. Determining placement of a thing within the visual content may include determining one or more of rotation, position, and/or size of the thing within the visual content.

The placement of the thing(s) within the visual content may be determined as the function of progress through the progress length of the video (e.g., determining the placement of the thing in different video frames of the video). Determining placement of a thing within the visual content may include determining changes in the placement of the thing as the function of progress through the progress length of the video (e.g., determining change in placement in different video frames of the video).

The placement of a thing within the visual content may be determined based on user selection, analysis of the visual content, and/or other information. User selection of the placement may refer to user input that identifies/designates the particular placement of the thing within the visual content. For example, a user may interact with a user interface to identify one or more of rotation, position, and/or size of a face within the visual content. Analysis of visual content may include analysis of the content of the video frames of the video, such as analysis of the arrangement of pixels, characteristics of pixels, values of pixels, and/or other aspects of pixels of the visual content. Analysis of visual content may include use of computer vision and/or other object detection/recognition techniques to determine the placement of a thing within the visual content. For example, analysis of the content of the video frames may be used to determine one or more of rotation, position, and/or size of a face within the visual content.

In some implementations, the placement of a thing within the visual content may be determined based on one or more stable features of the thing. A stable feature of a thing may refer to an element/part and/or a combination of elements/parts of the thing that does not change over time. A stable feature of a thing may refer to an element/part and/or a combination of elements/parts of the thing that does not change as the thing moves.

For example, a person's face may include elements/parts that are moved by the muscles of the face. For instance, the shape of a person's mouth may change (e.g., while talking, yelling, yawning), and the shape of a person's eyes/eyebrows may change (e.g., while smiling, blinking). Usage of such unstable features to determine the placement of a face may result in inaccurate determination of the placement.

Instead, a person's face may include elements/parts that are not moved/not moved very much (e.g., movement of the element/part is less than a threshold movement amount) by the muscles of the face. For example, upper cheek points/areas of a person's face may not move/be moved very much (e.g., change position, change shape) when the person is using the muscles of the face (e.g., while talking, yelling, yawning, smiling, blinking). As another example, a person's nose and ears may not move/be moved very much when the person is using the muscles of the face.

Usage of such stable features to determine the placement of a face may result in accurate determination of the placement at low cost. For example, rather than attempting to determine placement of a face by analyzing the entirety of the face, the placement of the face may be determined by using one or more of left upper cheek point/area, right upper cheek point/area, nose, ears, and/or other stable features of the face. The placement of the face may be determined by using a combination of stable elements. For example, the placement of the face within the visual content may be determined based on a width line that runs across eyes of the face. The width line may connect the left upper cheek point/area and right upper cheek point/area of the face. The width line may represent the locations of the left and right upper cheek points/areas of the face. The width line/left and right upper cheek points/areas of the face may provide indication of the rotation, position, and/or size of the face within the visual content. The width line/left and right upper cheek points/areas of the face may be resistant to changes/movement of the face.

For example, referring to FIG. 3, the placement of the face 302 within the video frame 300 may be determined based on a width line 316. The width line 316 may connect the left upper cheek point/area 312 and right upper cheek point/area 314 of the face 302. The position of the width line 316 (and/or positions of the left upper cheek point/area 312 and right upper cheek point/area 314) may indicate the position of the face 302 within the video frame 300. The rotation of the width line 316 (and/or orientation of the left upper cheek point/area 312 with respect to the right upper cheek point/area 314) may indicate the rotation of the face 302 within the video frame 300. The size of the width line 316 (and/or distance between the left upper cheek point/area 312 and right upper cheek point/area 314) may indicate the size of the face 302 within the video frame 300.

In some implementations, the placement of a thing within a particular video frame may be determined further based on the placement of the thing within one or more prior video frames and/or one or more subsequent video frames. The placement determined within preceding and/or following video frames may be used limit the placement determination within the video frame. Other determination of the placement of the thing(s) depicted within the visual content is contemplated.

The stabilization option component 106 may be configured to obtain selection of one or more stabilization options. Obtaining selection of stabilization option(s) may include one or more of accessing, acquiring, analyzing, determining, examining, identifying, loading, locating, opening, receiving, retrieving, reviewing, selecting, storing, and/or otherwise obtaining the selection of stabilization option(s). The stabilization option component 106 may obtain selection of stabilization option(s) from one or more locations. For example, the stabilization option component 106 may obtain selection of stabilization option(s) from a storage location, such as the electronic storage 13, electronic storage of information and/or signals generated by one or more sensors (e.g., touchscreen display sensor), electronic storage of a device accessible via a network, and/or other locations. The stabilization option component 106 may obtain selection of stabilization option(s) from one or more hardware components (e.g., user interface device) and/or one or more software components (e.g., software running on a computing device).

In some implementations, the stabilization option component 106 may obtain selection of stabilization option(s) based on user interaction with a user interface/application (e.g., video editing application, video player application), and/or other information. For example, a user interface/application may provide option(s) for a user to select options to be used in stabilization a video/depiction of a thing within a video. Selection of stabilization option(s) may be obtained based on the user's selection of the stabilization option(s) through the user interface/video application. For instance, the user interface/application may provide individual and/or combination of stabilization options for selection by the user. The user interface/application may provide the stabilization options with one or more video editing tools. For example, different stabilization options and/or different combinations of stabilization options may be used for different visual effects/themes, and the user may select the stabilization option(s) by selecting the visual effects/themes provided by/through the user interface/application.

In some implementations, different stabilization options may be selected and/or provided for selection based on the thing(s) depicted within the video. For instance, image/object recognition may be used to classify/identify the type(s) of thing(s) depicted within the video. Different types of things may be associated with different stabilization options, and the stabilization option(s) associated with the identified thing(s) may be provided for selection/selected for use. Other selections of stabilization option(s) for retrieval are contemplated.

In some implementations, the stabilization option(s) may be selected for the entire progress length of the video. That is, the stabilization option(s) that are selected may be used to stabilize the video/thing(s) depicted within the entire progress length of the video. In some implementations, the stabilization option(s) may be selected for the one or more portions of the progress length of the video. That is, the stabilization option(s) that are selected may be used to stabilize the video/thing(s) depicted within portion(s) of the progress length of the video. In some implementations, different stabilization options may be selected for different portions of the progress length of the video.

A stabilization option may refer to a stabilization technique, approach, and/or criteria that may be chosen for use in stabilizing the thing(s) depicted within the video. A stabilization option may refer to an option that allow for control in how the video/thing(s) depicted within the video are stabilized. A stabilization option may control/determine how a viewing window is placed within the field of view of the visual content to generate stabilized visual content. In some implementations, the stabilization options may include one or more facial stabilization options. A facial stabilization option may refer to a stabilization option for stabilizing depiction of a face within the video. In some implementations, the selection of the facial stabilization option(s) may be obtained based on user input identifying the facial stabilization option(s). For example, a user may select particular facial stabilization option(s) for use in stabilizing depiction of a face in the video. As another example, a use may select an effect and/or a theme that is associated with particular stabilization option(s).

In some implementations, the stabilization option(s) (e.g., facial stabilization options) may include an angle stabilization option, a position stabilization option, a size stabilization option, and/or other stabilization option(s). The angle stabilization option may refer to a stabilization option that controls/directs stabilization using rotation of a thing depicted within the video. The angle stabilization option may refer to a stabilization option that stabilizes the depiction of the thing by reducing the extent to which the thing may change rotational position (e.g., rotate) within the stabilized video. That is, stabilization of the video using the angle stabilization option may reduce angular movement (rotation) of the stabilized depiction of the thing within the stabilized visual content. For example, using the angle stabilization option for a face depicted within the video may cause the stabilization to reduce angular movement of the face within the stabilized video. The angle stabilization option may control/determine the rotation of the viewing window within the visual content to offset the angular movement of the thing depicted within the visual content. Usage of the angle stabilization option may result in angle correction in the stabilized visual content.

The position stabilization option may refer to a stabilization option that controls/directs stabilization using position of a thing depicted within the video. The position stabilization option may refer to a stabilization option that stabilizes the depiction of the thing by reducing the extent to which the thing may change translational position (e.g., move up, down, left right) within the stabilized video. That is, stabilization of the video using the position stabilization option may reduce translational movement of the stabilized depiction of the thing within the stabilized visual content. For example, using the position stabilization option for a face depicted within the video may cause the stabilization to reduce translational movement of the face within the stabilized video. The position stabilization option may control/determine the position of the viewing window within the visual content to offset the translational movement of the thing depicted within the visual content. Usage of the angle stabilization option may result in position correction in the stabilized visual content.

The size stabilization option may refer to a stabilization option that controls/directs stabilization using size of a thing depicted within the video. The size stabilization option may refer to a stabilization option that stabilizes the depiction of the thing by reducing the extent to which the thing may change its size within the stabilized video. That is, stabilization of the video using the size stabilization option may reduce change in size of the stabilized depiction of the thing within the stabilized visual content. For example, using the size stabilization option for a face depicted within the video may cause the stabilization to reduce change in size of the face within the stabilized video. Other stabilization options are contemplated. The size stabilization option may control/determine the size of the viewing window within the visual content to offset the change in size the thing depicted within the visual content. Usage of the angle stabilization option may result in scale correction in the stabilized visual content.

The stabilization options may be used to stabilize/frame the visual content based on placement of thing(s) within the visual content rather than based on movement of the image capture device. For example, the stabilization options may be used to generate stabilized visual content that focuses on a person (e.g., a person talking/singing, a person in a vlogging/selfie video, persons in a video conference). The stabilization options may be used to provide automatically pan and/or zoom effect to keep the thing(s) within the viewing widow. The stabilization options may be used edit one or more videos to create a consistent view of a person in the view at different moments within the video. The stabilization options may be used to stabilize videos in which information on image capture device movement (e.g., IMU data) is not available. For example, responsive to such information not being available for a video, the stabilization options may be provided and/or automatically used to stabilize the video. Other use of the stabilization options are contemplated.

The generation component 108 may be configured to generate stabilized visual content. The stabilized visual content may be generated based on the placement of the thing(s) within the visual content as the function of progress through the progress length, the stabilization option(s) (selected stabilization option(s)), and/or other information. The stabilized visual content may include stabilized depiction of the thing(s). For example, for visual content including depiction of a face, the generation component 108 may be configured to generate stabilized visual zed content based on the placement of the face within the visual content as the function of progress through the progress length, the facial stabilization options (selected facial stabilization option(s)), and/or other information. The stabilized visual content may include stabilized depiction of the face.

The stabilized visual content may include a punchout of one or more extents (spatial portions) of the visual content within one or more viewing windows. The stabilized visual content may be generated as images/video frames including extent(s) of the visual content within the viewing window(s). Inclusion of the extent(s) of the visual content within the viewing window(s) in the stabilized visual content may effectuate stabilization of the visual content via selective cropping. The portions of the visual content that are cropped for stabilization may depend on the placement of the thing(s) within the visual content as the function of progress through the progress length and the stabilization option(s).

In some implementations, generation of the stabilization visual content may include determination of a viewing window for the visual content. The viewing window may define one or more extents of the visual content. A viewing window may define extents of the visual content to be included within the stabilized visual content as the function of progress through the progress length. A viewing window may define which portions of the visual content are included within the stabilized visual content at different moment within the progress length.

A viewing window may be used to provide a punchout of the visual content. A punchout of the visual content may refer to an output of one or more extents of the visual content for presentation (e.g., current presentation, future presentation based on video generated using the punchout). A punchout of the visual content may refer to extents of the visual content that is obtained for viewing and/or extraction. The extents of the visual content viewable/extracted within the viewing window may be used to provide views of different spatial portions of the visual content.

For example, the visual content may include a field of view, and the punchout of the visual content may include the entire extent of the visual content (the visual content within the entire field of view) or one or more extents of the visual content (the visual content within one or more portions of the field of view). The punchout of the visual content may be presented on one or more displays, included in one or more videos, and/or otherwise used for presenting stabilized view of the visual content.

The viewing window may be determined as the function of progress through the progress length of the video based on the placement of the thing(s) (e.g., face) within the visual content as the function of progress through the progress length, the stabilization option(s) (e.g., facial stabilization option(s)), and/or other information. The viewing window may define extents of the visual content to be included within the stabilized visual content as the function of progress through the progress length of the video.

One or more of rotation, position, size, shape, and/or other characteristics of the viewing window may be determined for different moments within the progress length of the visual content. One or more of rotation, position, size, shape, and/or other characteristics of the viewing window may be determined as the function of progress through the progress length of the video based on the placement of the thing(s) (e.g., face) within the visual content as the function of progress through the progress length, the stabilization option(s) (e.g., facial stabilization option(s)), and/or other information.

For example, determination of the viewing window may include determination of a placement of the viewing window within the field of view of the visual content as the function of progress through the progress length based on the placement of the thing(s) within the visual content as the function of progress through the progress length, the stabilization option(s), and/or other information. The placement of the viewing window may refer to how the viewing window is located within the field of view of the visual content. The placement of the viewing window may include one or more of rotation, position, size, shape, and/or other characteristics of the viewing window. The placement of the viewing window may be determined to offset changes in the depiction of the thing(s) within the visual content, so that the placement of the thing(s) depicted within the visual content does not appear to change/change more than a threshold amount.

In some implementations, the determination of the viewing window may include determination of rotation of the viewing window with respect to the field of view of the visual content based on the placement of the thing(s) (e.g., face) within the visual content and the angle stabilization option. The rotation of the viewing window with respect to the field of view of the visual content may be determined as a function of progress through the progress length based on the rotation of the thing(s) depicted within the visual content. For example, the rotation of the viewing window with respect to the field of view of the visual content may be determined as a function of progress through the progress length based on the rotation of a face depicted within the visual content.

The viewing window may be rotated to compensate for rotation of the face such that a view of the visual content within the viewing window includes depiction of face that does not appear to rotate/rotate more than a threshold amount. The rotation of the viewing window may be determined for different moments within the progress length. The amount and direction by which the viewing window is rotated may match the amount and direction by which the depicted thing rotates in the visual content. For example, based on the face rotating clockwise by 15 degrees, the viewing window may be rotated clockwise by 15 degrees.

FIG. 4 illustrates an example viewing window to stabilize depiction of a face within a video. In FIG. 4, a viewing window 420 may be rotated to the left (counterclockwise) to compensate for rotation of the face 402 within the video frame 400. The rotation of the viewing window 420 may cause the face 402 to appear upright within the viewing window 420, and may provide angle correction. While the face 402 is corrected to appear upright within the viewing window 420 in FIG. 4, this is merely as an example and is not meant to be limiting. In some implementations, it may be desirable to provide a tilted view of a thing, and the angle correction may provide a stabilized view in which the thing is depicted with a consistent angle.

In some implementations, the determination of the viewing window may include determination of position of the viewing window within the field of view of the visual content based on the placement of the thing(s) (e.g., face) within the visual content and the position stabilization option. The position of the viewing window within the field of view of the visual content may be determined as a function of progress through the progress length based on the position of the thing(s) depicted within the visual content. For example, the position of the viewing window within the field of view of the visual content may be determined as a function of progress through the progress length based on the position of a face depicted within the visual content.

The viewing window may be positioned to compensate for change in position of the face such that a view of the visual content within the viewing window includes depiction of face that does not appear to move translationally/move translationally more than a threshold amount. The position of the viewing window may be determined for different moments within the progress length. The amount and direction by which the viewing window is moved translationally may match the amount and direction by which the depicted thing moves translationally in the visual content. For example, based on the face moving to the left by a certain amount, the viewing window may be moved to the left by the same amount.

FIG. 5 illustrates an example viewing window to stabilize depiction of a face within a video. In FIG. 5, a viewing window 520 may be positioned so that the center of the viewing window 520 is below and to the left of the center of the video frame 500. Such positioning of the viewing window 520 may compensate for the translational movement of the face 502 within the video frame 500. The positioning of the viewing window 520 may cause the face 502 to appear at the center of the viewing window, and may provide position correction. While the face 502 is corrected to appear at the center of the viewing window 520 in FIG. 5, this is merely as an example and is not meant to be limiting. In some implementations, it may be desirable to provide a non-center view of a thing, and the position correction may provide a stabilized view in which the thing is depicted at a particular non-center location (e.g., automatically position the face following the rule of thirds).

In some implementations, the determination of the viewing window may include determination of size of the viewing window based on the placement of the thing(s) (e.g., face) within the visual content and the size stabilization option. The size of the viewing window may be determined as a function of progress through the progress length based on the size of the thing(s) depicted within the visual content. For example, the size of the viewing window may be determined as a function of progress through the progress length based on the size of a face depicted within the visual content.

The viewing window may be sized to compensate for change in sized of the face such that a view of the visual content within the viewing window includes depiction of face that does not appear to change in size/change in size more than a threshold amount. The size of the viewing window may be determined for different moments within the progress length. The amount by which the size of the viewing window is changed and whether the size increases or decreases may match the change in size of the thing depicted in the visual content. For example, based on the size of the face decreasing by 10%, the size of the viewing window may be decreased by 10%.

In some implementations, the viewing window may be sized based on largest depiction of the thing(s) within the visual content. The size of the viewing window used for the largest depiction of thing(s) may determine the scale/zoom factor with which the thing(s) are depicted within the viewing window. The size of the viewing window used for the largest depiction of thing(s) may be the largest size of the viewing window for generation of the stabilized visual content. For example, the size of the viewing window when the largest depiction of a face appears in the visual content may be used as the reference size for the viewing window. As the depiction of the face gets smaller in the viewing window, the size of the viewing window may get smaller to maintain the same scale of the face within the viewing window.

FIG. 6 illustrates an example viewing window to stabilize depiction of a face within a video. In FIG. 6, a viewing window 620 may be sized (decreased in size) so that the ratio/scale of the face 602 to the viewing window 620 remains consistent with the ratio/scale of the face to the viewing window at other moments within the progress length of the video. For instance, the ratio/scale of the face 602 to the viewing window 620 may be the same as/within a threshold amount of the ratio/scale of the face 502 to the viewing window 520. The change in size of the viewing window 620 may compensate for change in size of the face 602 within the video frame 600. The sizing of the viewing widow 620 may cause the face 602 to appear with same on the display, and may provide scale correction. While the face 602 is corrected to appear to take up most of vertical space within the viewing window 620, this is merely as an example and is not meant to be limiting. Other ratio/scale of the thing depicted in the visual content to the viewing window is contempt.

FIG. 7 illustrates an example viewing window to stabilize depiction of a face within a video. In FIG. 7, a viewing window 720 may be rotated to the right (clockwise) to compensate for rotation of a face 702 within a video frame 700. The viewing window 720 may be positioned so that the center of the viewing window 720 is above and to the left of the center of the video frame 500. Such positioning of the viewing window 720 may compensate for the translational movement of the face 702 within the video frame 700. The viewing window 720 may be sized so that the ratio/scale of the face 702 to the viewing window 720 remains consistent with the ratio/scale of the face to the viewing window at other moments within the progress length of the video.

Figure 8:
FIG. 8 illustrates example video frames including depiction of a face.

FIG. 8 illustrates example video frames 802, 804, 806, 808 including depiction of a person, including the person's a face. The video frames 802, 804, 806, 808 may include different placement of the face based on movement of the face during capture. For example, the person may have moved to the left for capture of the video frame 804, moved to the right for capture of the video frame 806, and moved towards the image capture device for capture of the video frame 808.

Figure 9:
FIG. 9 illustrates example video frames including stabilized depiction of a face.
Figure 9:
Figure 9:

FIG. 9 illustrates example video frames 902, 904, 906, 908 including stabilized depiction of a face. The video frames 902, 904, 906, 908 may include extents of the video frames 802, 804, 806, 808 within a viewing window, with the viewing window placed in the video frames 802, 804, 806, 808 to compensate for different placement of the face within the video frames 802, 804, 806, 808. The stabilized depiction of the face in the video frames 902, 904, 906, 908 may not show as much translational movement, rotational movement, and/or change in size as the depiction of the face in the video frames 802, 804, 806, 808.

Figure 10:
FIG. 10 illustrates example feature detection for stabilization.
Figure 10:
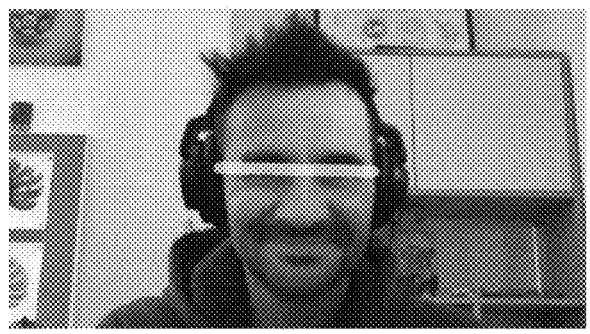
Figure 10:

FIG. 10 illustrates example feature detection for stabilization. Width line of a face may be shown in images 1002, 1004, 1006. The image 1002 may be an image captured by an image capture device. The image 1004 may be a punchout of the image 1002, with the viewing window centered on the face. The image 1006 may be a punchout of another image. As can be seen in images 1004, 1006, the punchout of the images may maintain (e.g., keep same, keep within threshold amount) the rotation, position, and size of width line, which may result in stabilized view of the face.

Figure 11:
FIG. 11 illustrates example mirroring of visual content.

In some implementations, the viewing window may be restricted from going beyond the field of view of the visual content. That is, the viewing window may be required to be placed so that the entirety of the viewing window is within the field of view of the visual content. In some implementations, the viewing window may not be restricted from going beyond the field of view of the visual content. That is, the viewing window may be allowed to be placed so that one or more portions of the viewing window is outside the field of view of the visual content. Responsive to the viewing window extending beyond the field of view of the visual content, one or more extents of the visual content may be duplicated to fill the portion(s) of the viewing window outside the field of view of the visual content. For example, the visual content may be mirrored on one or more sides. For instance, FIG. 11 illustrates example mirroring of visual content. Such duplication of visual content may allow the viewing window to extend beyond the original field of view of the visual content, and still have pixel information to provide punchout for stabilization. For example, video frames 904, 908 in FIG. 9 may include mirrored visual content on the left side based on the viewing window extending beyond the field of view of the original visual content.

In some implementation, the stabilized visual content may be generated as an encoded video edit (e.g., an encoded video file). For example, the stabilized visual content may be generated as an encoded in a particular video clip, and the video clip may be opened in a video player for presentation. In some implementations, the stabilized visual content may be generated as instruction identifying/defining the viewing window to be used in providing a stabilized view of the visual content. A video play use the instructions to retrieve the extents of the video within the viewing window for presentation.

Implementations of the disclosure may be made in hardware, firmware, software, or any suitable combination thereof. Aspects of the disclosure may be implemented as instructions stored on a machine-readable medium, which may be read and executed by one or more processors. A machine-readable medium may include any mechanism for storing or transmitting information in a form readable by a machine (e.g., a computing device). For example, a tangible computer-readable storage medium may include read-only memory, random access memory, magnetic disk storage media, optical storage media, flash memory devices, and others, and a machine-readable transmission media may include forms of propagated signals, such as carrier waves, infrared signals, digital signals, and others. Firmware, software, routines, or instructions may be described herein in terms of specific exemplary aspects and implementations of the disclosure, and performing certain actions.

In some implementations, some or all of the functionalities attributed herein to the system 10 may be provided by external resources not included in the system 10. External resources may include hosts/sources of information, computing, and/or processing and/or other providers of information, computing, and/or processing outside of the system 10.

Although the processor 11 and the electronic storage 13 are shown to be connected to the interface 12 in FIG. 1, any communication medium may be used to facilitate interaction between any components of the system 10. One or more components of the system 10 may communicate with each other through hard-wired communication, wireless communication, or both. For example, one or more components of the system 10 may communicate with each other through a network. For example, the processor 11 may wirelessly communicate with the electronic storage 13. By way of non-limiting example, wireless communication may include one or more of radio communication, Bluetooth communication, Wi-Fi communication, cellular communication, infrared communication, or other wireless communication. Other types of communications are contemplated by the present disclosure.

Although the processor 11 is shown in FIG. 1 as a single entity, this is for illustrative purposes only. In some implementations, the processor 11 may comprise a plurality of processing units. These processing units may be physically located within the same device, or the processor 11 may represent processing functionality of a plurality of devices operating in coordination. The processor 11 may be configured to execute one or more components by software; hardware; firmware; some combination of software, hardware, and/or firmware; and/or other mechanisms for configuring processing capabilities on the processor 11.

It should be appreciated that although computer components are illustrated in FIG. 1 as being co-located within a single processing unit, in implementations in which processor 11 comprises multiple processing units, one or more of computer program components may be located remotely from the other computer program components. While computer program components are described as performing or being configured to perform operations, computer program components may comprise instructions which may program processor 11 and/or system 10 to perform the operation.

While computer program components are described herein as being implemented via processor 11 through machine-readable instructions 100, this is merely for ease of reference and is not meant to be limiting. In some implementations, one or more functions of computer program components described herein may be implemented via hardware (e.g., dedicated chip, field-programmable gate array) rather than software. One or more functions of computer program components described herein may be software-implemented, hardware-implemented, or software and hardware-implemented.

The description of the functionality provided by the different computer program components described herein is for illustrative purposes, and is not intended to be limiting, as any of computer program components may provide more or less functionality than is described. For example, one or more of computer program components may be eliminated, and some or all of its functionality may be provided by other computer program components. As another example, processor 11 may be configured to execute one or more additional computer program components that may perform some or all of the functionality attributed to one or more of computer program components described herein.

The electronic storage media of the electronic storage 13 may be provided integrally (i.e., substantially non-removable) with one or more components of the system 10 and/or removable storage that is connectable to one or more components of the system 10 via, for example, a port (e.g., a USB port, a Firewire port, etc.) or a drive (e.g., a disk drive, etc.). The electronic storage 13 may include one or more of optically readable storage media (e.g., optical disks, etc.), magnetically readable storage media (e.g., magnetic tape, magnetic hard drive, floppy drive, etc.), electrical charge-based storage media (e.g., EPROM, EEPROM, RAM, etc.), solid-state storage media (e.g., flash drive, etc.), and/or other electronically readable storage media. The electronic storage 13 may be a separate component within the system 10, or the electronic storage 13 may be provided integrally with one or more other components of the system 10 (e.g., the processor 11). Although the electronic storage 13 is shown in FIG. 1 as a single entity, this is for illustrative purposes only. In some implementations, the electronic storage 13 may comprise a plurality of storage units. These storage units may be physically located within the same device, or the electronic storage 13 may represent storage functionality of a plurality of devices operating in coordination.

Figure 2:
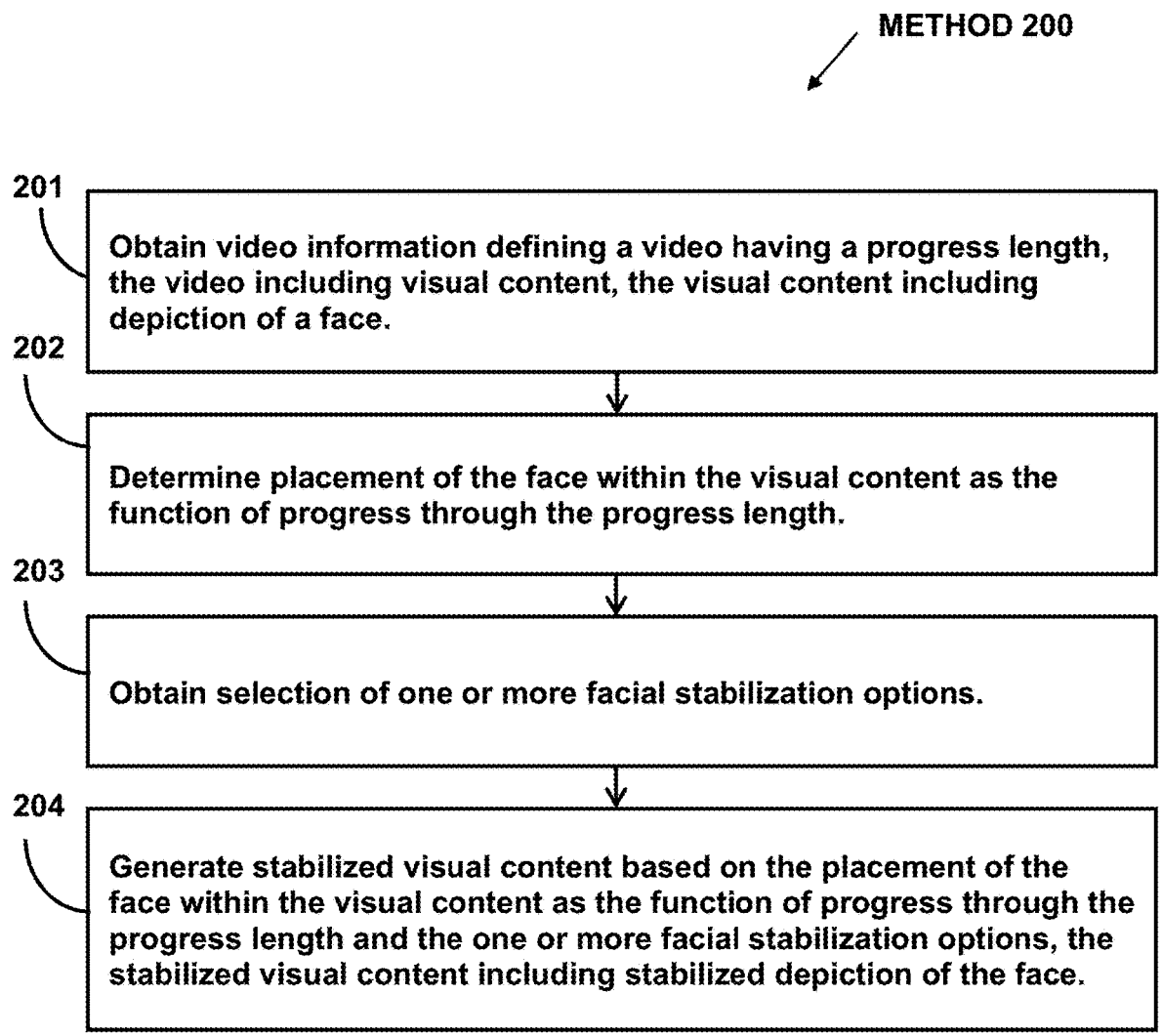
FIG. 2 illustrates a method for stabilizing videos.

FIG. 2 illustrates method 200 for stabilizing videos. The operations of method 200 presented below are intended to be illustrative. In some implementations, method 200 may be accomplished with one or more additional operations not described, and/or without one or more of the operations discussed. In some implementations, two or more of the operations may occur simultaneously.

In some implementations, method 200 may be implemented in one or more processing devices (e.g., a digital processor, an analog processor, a digital circuit designed to process information, a central processing unit, a graphics processing unit, a microcontroller, an analog circuit designed to process information, a state machine, and/or other mechanisms for electronically processing information). The one or more processing devices may include one or more devices executing some or all of the operation of method 200 in response to instructions stored electronically on one or more electronic storage mediums. The one or more processing devices may include one or more devices configured through hardware, firmware, and/or software to be specifically designed for execution of one or more of the operations of method 200.

Referring to FIG. 2 and method 200, at operation 201, video information may be obtained. The video information may define a video having a progress length. The video may include visual content. The visual content may include depiction of a face. In some implementations, operation 201 may be performed by a processor component the same as or similar to the video information component 102 (Shown in FIG. 1 and described herein).

At operation 202, placement of the face within the visual content may be determined as the function of progress through the progress length. In some implementations, operation 202 may be performed by a processor component the same as or similar to the placement component 104 (Shown in FIG. 1 and described herein).

At operation 203, selection of one or more facial stabilization options may be obtained. In some implementations, operation 203 may be performed by a processor component the same as or similar to the stabilization option component 106 (Shown in FIG. 1 and described herein).

At operation 204, stabilized visual content may be generated based on the placement of the face within the visual content as the function of progress through the progress length and the facial stabilization option(s). The stabilized visual content may include stabilized depiction of the face. In some implementations, operation 204 may be performed by a processor component the same as or similar to the generation component 108 (Shown in FIG. 1 and described herein).

Although the system(s) and/or method(s) of this disclosure have been described in detail for the purpose of illustration based on what is currently considered to be the most practical and preferred implementations, it is to be understood that such detail is solely for that purpose and that the disclosure is not limited to the disclosed implementations, but, on the contrary, is intended to cover modifications and equivalent arrangements that are within the spirit and scope of the appended claims. For example, it is to be understood that the present disclosure contemplates that, to the extent possible, one or more features of any implementation can be combined with one or more features of any other implementation.

What is claimed is:

1. A system for stabilizing videos, the system comprising: one or more physical processors configured by machine-readable instructions to:
obtain video information defining a video having a progress length, the video including visual content, the visual content including depiction of a face;
determine placement of the face within the visual content as the function of progress through the progress length based on one or more stable features of the face; and
generate stabilized visual content based on the placement of the face within the visual content as the function of progress through the progress length, the stabilized visual content including stabilized depiction of the face, wherein generation of the stabilization visual content based on the placement of the face within the visual content as the function of progress through the progress length results in stabilization of the visual content based on the one or more stable features of the face included within the visual content rather than movement of an image capture device that captured the visual content.

2. The system of claim 1, wherein the one or more stable features of the face include one or more elements or one or more parts of the face that are not moved by muscles of the face.

3. The system of claim 1, wherein the one or more stable features of the face include one or more elements or one or more parts of the face that are not moved more than a threshold amount by muscles of the face.

4. The system of claim 1, wherein the one or more stable features of the face include a width line that runs across eyes of the face.

5. The system of claim 1, wherein the stabilized visual content is generated further based on one or more facial stabilization options.

6. The system of claim 5, wherein the one or more facial stabilization options includes an angle stabilization option, a position stabilization option, and/or a size stabilization option.

7. The system of claim 6, wherein the angle stabilization option reduces angular movement of the stabilized depiction of the face within the stabilized visual content.

8. The system of claim 6, wherein the position stabilization option reduces translational movement of the stabilized depiction of the face within the stabilized visual content.

9. The system of claim 6, wherein the size stabilization option reduces change in size of the stabilized depiction of the face within the stabilized visual content.

10. A method for stabilizing videos, the method performed by a computing system including one or more processors, the method comprising:
obtaining, by the computing system, video information defining a video having a progress length, the video including visual content, the visual content including depiction of a face;
determining, by the computing system, placement of the face within the visual content as the function of progress through the progress length based on one or more stable features of the face; and
generating, by the computing system, stabilized visual content based on the placement of the face within the visual content as the function of progress through the progress length, the stabilized visual content including stabilized depiction of the face, wherein generating the stabilization visual content based on the placement of the face within the visual content as the function of progress through the progress length results in stabilization of the visual content based on the one or more stable features of the face included within the visual content rather than movement of an image capture device that captured the visual content.

11. The method of claim 10, wherein the one or more stable features of the face include one or more elements or one or more parts of the face that are not moved by muscles of the face.

12. The method of claim 10, wherein the one or more stable features of the face include one or more elements or one or more parts of the face that are not moved more than a threshold amount by muscles of the face.

13. The method of claim 10, wherein the one or more stable features of the face include a width line that runs across eyes of the face.

14. The method of claim 10, wherein the stabilized visual content is generated further based on one or more facial stabilization options.

15. The method of claim 14, wherein the one or more facial stabilization options includes an angle stabilization option, a position stabilization option, and/or a size stabilization option.

16. The method of claim 15, wherein the angle stabilization option reduces angular movement of the stabilized depiction of the face within the stabilized visual content.

17. The method of claim 15, wherein the position stabilization option reduces translational movement of the stabilized depiction of the face within the stabilized visual content.

18. The method of claim 15, wherein the size stabilization option reduces change in size of the stabilized depiction of the face within the stabilized visual content.

19. A system for stabilizing videos, the system comprising:
one or more physical processors configured by machine-readable instructions to:
obtain video information defining a video having a progress length, the video including visual content, the visual content including depiction of a face;
determine placement of the face within the visual content as the function of progress through the progress length based on one or more stable features of the face, the one or more stable features of the face including one or more elements or one or more parts of the face that are not moved or are not moved more than a threshold amount by muscles of the face; and
generate stabilized visual content based on the placement of the face within the visual content as the function of progress through the progress length, the stabilized visual content including stabilized depiction of the face, wherein generation of the stabilization visual content based on the placement of the face within the visual content as the function of progress through the progress length results in stabilization of the visual content based on the one or more stable features of the face included within the visual content rather than movement of an image capture device that captured the visual content.

20. The system of claim 19, wherein the stabilized visual content is generated further based on one or more facial stabilization options, the one or more facial stabilization options including an angle stabilization option, a position stabilization option, and/or a size stabilization option.

\* \* \* \* \*